J. HAYDEN.
HAY RACK.
APPLICATION FILED OCT. 12, 1910.
989,356.
Patented Apr. 11, 1911.
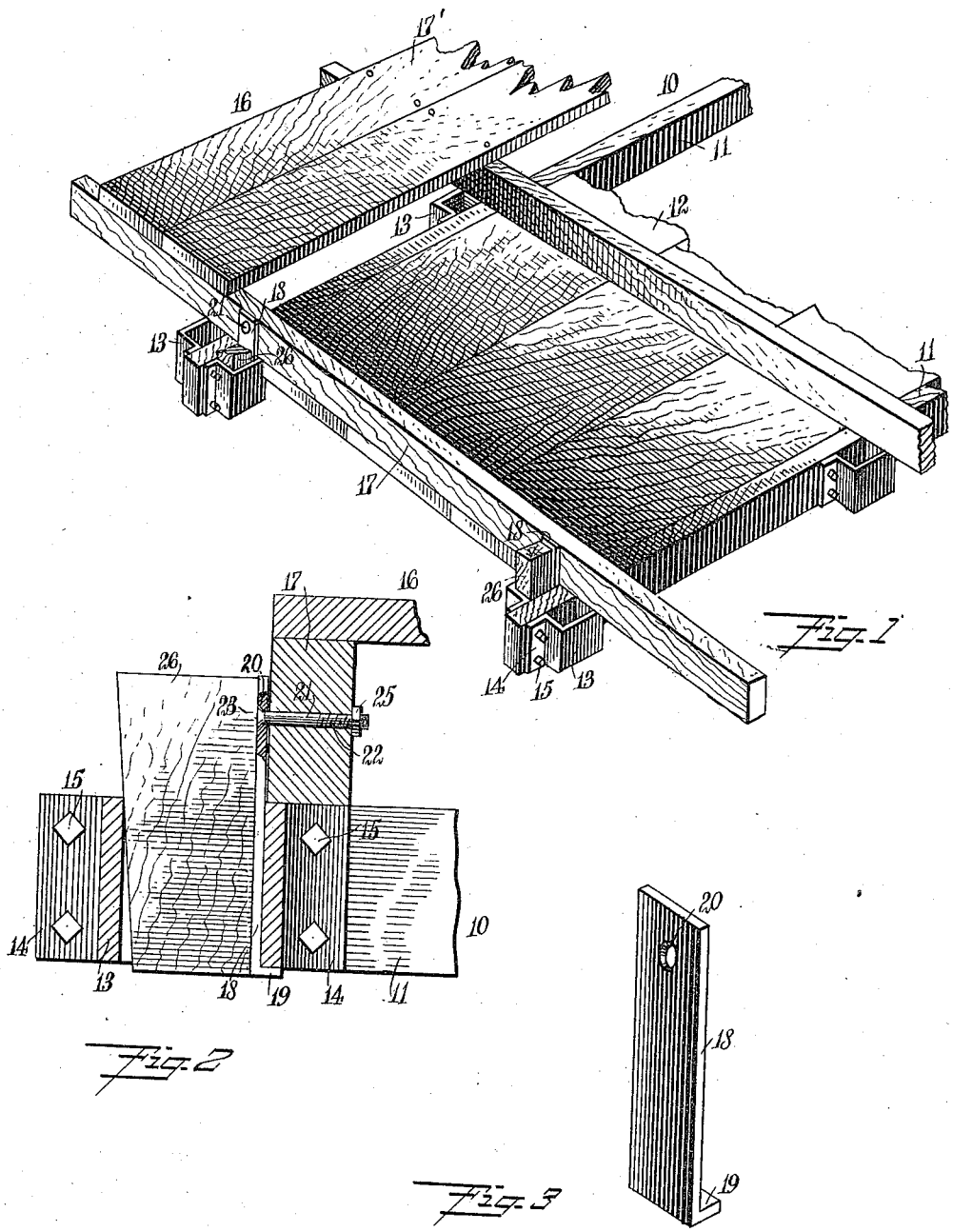
WITNESSES:
INVENTOR
James Hayden
BY
ATTORNEYS

UNITED STATES PATENT OFFICE.

JAMES HAYDEN, OF LE SUEUR, MINNESOTA.

HAY-RACK.

989,356.

Specification of Letters Patent.

Patented Apr. 11, 1911.

Application filed October 12, 1910. Serial No. 586,634.

*To all whom it may concern:*

Be it known that I, JAMES HAYDEN, a citizen of the United States, and a resident of Le Sueur, in the county of Lesueur and State of Minnesota, have invented a new and Improved Hay-Rack, of which the following is a full, clear, and exact description.

This invention relates to hay racks adapted to be removably associated with vehicle frames and like structures, and has reference more particularly to the combination with a frame having a socket, of a rack adapted to be mounted upon the frame, and having a securing member adapted to enter the socket, and a stop member removably located in the socket and serving to hold the securing member in place.

The object of the invention is to provide a simple, strong and durable rack, which can be removably mounted upon a vehicle frame or like structure, and thereby adapt the same to receive loads of hay or like material which necessitate a wide support, which is so constructed that it can be easily secured in position and removed from the frame, with little trouble and loss of time, which when in position cannot easily be accidentally displaced, and with which the wagon stakes and sockets used with the frame can be employed to assist in securing the rack in place.

The invention consists in the construction and combination of parts to be more fully described hereinafter and particularly set forth in the claim.

Reference is to be had to the accompanying drawings forming a part of this specification, in which similar characters of reference indicate corresponding parts in all the views, and in which—

Figure 1 is a perspective view of part of a wagon frame having a hay rack mounted thereon, and having associated therewith an embodiment of my invention; Fig. 2 is an enlarged transverse section of a part of the wagon frame and the rack, showing the means for securing the rack to the frame; and Fig. 3 is a perspective view of one of the securing members.

Before proceeding to a more detailed explanation of my invention, it should be clearly understood that certain types of farm vehicles such as are used for ordinary purposes, can be adapted to receive loads such as hay, straw or the like, by placing upon the wagon frames, racks which extend laterally from the frame and thus provide the necessary wide supports. Various means are provided for securing the racks in place, but many of these have defects which render them objectionable.

My invention provides means for removably securing the rack in position, so that it cannot be easily displaced, which can be rapidly manipulated, and which does not necessitate any special structural features of the wagon frame or the rack.

Certain of the details disclosed for example in the accompanying drawings, form no part of the invention, and can be varied in accordance with individual preference and special conditions, without departing from the underlying spirit of the invention.

Referring more particularly to the drawings, I have shown part of a wagon frame 10, comprising side sills or longitudinal frame members 11, supporting in any suitable manner, the floor boards 12. At the ends, the sills have sockets 13 at both sides. These sockets consist preferably of U-shaped members having flanges 14 by means of which they are fastened to the sills, bolts or rivets 15 being employed to secure the sockets in position. The sockets may be of any other suitable form however. The rack 16 comprises cross pieces 17 adapted to extend transversely of, and to be supported upon the wagon frame. The rack boards 17' are secured upon the cross pieces and extend longitudinally of the rack at each side thereof, being positioned at the sides of the wagon frame and extending laterally beyond it in the usual manner.

Certain of the cross pieces 17 have fastened thereto securing members 18. These consist of elongated bars of iron or the like, having at the lower ends laterally disposed toes or flanges 19, and being provided near the upper ends with openings 20. These receive the fastening bolts 21 which extend through suitable openings 22 provided for the purpose in the cross pieces. Each bolt has a flat, laterally extended head 23 countersunk in the opening 20. Nuts 25 of the usual character serve to secure the bolts in place. The securing members 18 extend downwardly from the cross pieces, and are arranged to project into and through the sockets 13, as is shown most clearly in Fig. 2. The flanges or toes 19 at the lower ends of the holding members engage at the under edges of the sockets, and prevent the upward displacement of the rack. The stop members 26, consisting preferably of suitable, wedge-shaped bodies of wood or any other material adapted for the purpose, are removably arranged in the sockets, and engage the securing members to hold them in position. The stop members can be driven into the sockets securely, so that they are firmly wedged in place.

The sockets 13 serve for the reception of the usual wagon stakes employed with the wagon body, to hold the side boards of the wagon, or for like purposes. If so desired, the stop members 26 can be dispensed with, and the stakes themselves can be employed to hold the securing members 18 in place.

Having thus described my invention, I claim as new, and desire to secure by Letters Patent:

The combination with a wagon frame having upright sockets, of a rack adapted to be mounted upon said frame and having downwardly extending securing members each adapted to be removably received in one of said sockets, and engaging at the inner side thereof, each of said members having the lower end laterally disposed to engage under the lower, inner edge of its socket, and removable wedges located in said sockets and serving to hold said securing members in place.

In testimony whereof I have signed my name to this specification in the presence of two subscribing witnesses.

JAMES HAYDEN.

Witnesses:
  Thos. H. Smullen,
  Melvin B. Morton.

---

Copies of this patent may be obtained for five cents each, by addressing the "Commissioner of Patents, Washington, D. C."